(12) United States Patent
Lee

(10) Patent No.: US 8,555,045 B2
(45) Date of Patent: Oct. 8, 2013

(54) ELECTRONIC METER FOR CONCURRENTLY UPDATING FIRMWARE AND COLLECTING METER USAGE WITH A MICRO CONTROLLER CALCULATES THE USAGE WHEN A RESET TIME IS LONGER THAN A PREDETERMINED PERIOD OF STORING TIME

(75) Inventor: Jung Hoo Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 243 days.

(21) Appl. No.: 12/986,478

(22) Filed: Jan. 7, 2011

(65) Prior Publication Data

US 2012/0036343 A1    Feb. 9, 2012

(30) Foreign Application Priority Data

Aug. 6, 2010  (KR) ........................ 10-2010-0076074

(51) Int. Cl.
*G06F 9/00*        (2006.01)
*G06F 15/00*       (2006.01)

(52) U.S. Cl.
USPC .................................. 713/1; 712/245; 713/2

(58) Field of Classification Search
USPC ....................................................... 713/1, 2
See application file for complete search history.

(56) References Cited

U.S. PATENT DOCUMENTS

| | | | | |
|---|---|---|---|---|
| 5,467,286 A | * | 11/1995 | Pyle et al. ........................ | 702/62 |
| 7,065,457 B1 | * | 6/2006 | Germer et al. ................... | 702/64 |
| 2003/0154471 A1 | * | 8/2003 | Teachman et al. ............. | 717/171 |
| 2007/0013547 A1 | * | 1/2007 | Boaz ........................ | 340/870.02 |
| 2012/0060152 A1 | * | 3/2012 | Oh et al. ....................... | 717/170 |

FOREIGN PATENT DOCUMENTS

| | | |
|---|---|---|
| JP | 2008146250 A | 6/2008 |
| KR | 1020080050355 | * 5/2008 |
| KR | 1020020090124256 A | 12/2009 |

OTHER PUBLICATIONS

Office Action KR 1020080050355 dated Oct. 31, 2011.

\* cited by examiner

*Primary Examiner* — Thomas Lee
*Assistant Examiner* — Phil Nguyen
(74) *Attorney, Agent, or Firm* — Lowe, Hauptman & Ham

(57) ABSTRACT

There are provided an electronic apparatus and a meter which are operable during the updating of an operating program and firmware. The electronic apparatus operable during program updating includes an operation unit performing a preset operation, a micro controller controlling an operation result of the operation unit to be stored according to a predetermined period of storing time, and controlling a program received from the outside to be stored, an update controller allowing the program stored during the predetermined period of storing time to be updated in the micro controller, and a storing unit storing the program and the operation result under control of the micro controller.

24 Claims, 2 Drawing Sheets

ELECTRONIC METER FOR CONCURRENTLY UPDATING FIRMWARE AND COLLECTING METER USAGE WITH A MICRO CONTROLLER CALCULATES THE USAGE WHEN A RESET TIME IS LONGER THAN A PREDETERMINED PERIOD OF STORING TIME

CROSS-REFERENCE TO RELATED APPLICATIONS

This application claims the priority of Korean Patent Application No. 10-2010-76074 filed on Aug. 6, 2010, in the Korean Intellectual Property Office, the disclosure of which is incorporated herein by reference.

BACKGROUND OF THE INVENTION

1. Field of the Invention

The present invention relates to an electronic apparatus and a meter, and more particularly, to an electronic apparatus and a meter which are operable during the updating of an operating program and firmware.

2. Description of the Related Art

With the recent increase in the multifunctionality and utilization of an electronic apparatus, the electronic apparatus has been widely used in a daily life of a user.

One of the widely-used electronic apparatuses may include a meter for measuring physical amounts for electricity, gas, water and the like which are supplied to a home or a building.

In the case of the conventional meter, after the amounts of electricity, gas, water, and the like which have been supplied are measured during a predetermined time period, a meter reader reads the meter in person, and transmits data relating to physical amounts of electricity, gas, water, and the like to a central center.

However, with the development of communication technologies, such as remote wireless communication and data communication, there has been utilized an electronic meter which measures physical amounts for supplied electricity, gas, and water, and the like and transmits the measured physical amounts through wireless/wired communications.

In the case of an electronic meter, the firmware of a microprocessor is updated through a wired/wireless communication, so as to change a measuring date, a billing system, and the like. At this time, the electronic meter stops the operations of the micro processor while the firmware is being updated, and then restarts the micro processor. Therefore, there is a problem in that it is impossible to measure physical amounts of electricity, gas, water, and the like during the updating of the firmware.

SUMMARY OF THE INVENTION

An aspect of the present invention provides an electronic apparatus and a meter which are operable during the updating of an operating program and firmware.

According to an aspect of the present invention, there is provided an electronic apparatus operable during program updating, including: an operation unit performing a preset operation; a micro controller controlling an operation result of the operation unit to be stored according to a predetermined period of storing time, and controlling a program received from the outside to be stored; an update controller allowing the program stored during the predetermined period of storing time to be updated in the micro controller; and a storing unit storing the program and the operation result under control of the micro controller.

The operation unit may detect physical amounts and accumulatively calculates the detected physical amounts.

The electronic apparatus may include an interface through which the program is received from the outside.

The update controller may allow the program, stored in the storing unit during the predetermined period of the storing time, to be updated in the micro controller, and resets the micro controller.

The micro controller may include: a micro controller core controlling the operation result of the operation unit to be stored; a data memory storing data required for the micro controller core; a program memory storing the program by the update controller; a clock controller providing a clock required for the micro controller core; and a real-time clock provider providing a real-time clock after resetting the micro controller core.

The electronic apparatus may further include a program updating bus through which the program is transmitted, wherein the update controller may transmit the program of the storing unit to the program memory of the micro controller through the program updating bus, after stopping operations of the interface and the micro controller so as to update the program.

The interface may include a plurality of communication circuits, and after stopping operations of other communication circuits among the plurality of the communication circuits of the interface and an operation of the micro controller so as to update the program, the update controller may transmit the program of the storing unit to the program memory of the micro controller through at least one of communication circuits in operation among the communication circuits of the interface.

The update controller may generate control signals and addresses of the program memory and the storing unit to thereby transmit the program through the program updating bus.

The micro controller may further include the interface.

The micro controller may have an update time which is within the predetermined period of the storing time.

The program may be firmware used for the operating of the micro controller.

According to another aspect of the present invention, there is provided a meter operable during program updating including: an operation unit performing a preset detection operation; a micro controller controlling a detection result of the operation unit to be stored according to a predetermined period of storing time, and controlling a program received from the outside to be stored; an update controller allowing the program stored during the predetermined period of storing time to be updated in the micro controller; and a storing unit storing the program and the detection result under control of the micro controller.

The operation unit may detect a physical amount of at least one of electricity, gas, and water supplied to a user, and may accumulatively calculate the detected physical amount and store the calculated amount according to the predetermined period of the storing time.

The operation unit may include: an analog unit converting detected analog data into digital data; and a calculating unit accumulatively calculating the digital data from the analog unit under the control of the micro controller.

The meter may further include an interface through which the program is received from the outside.

The update controller may allow the program, stored in the storing unit during the predetermined period of the storing time, to be updated in the micro controller, and reset the micro controller.

The micro controller may include: a micro controller core controlling an operation result of the operation unit to be stored; a data memory storing data required for the micro controller core; a program memory storing the program by the update controller; a clock controller providing a clock required for the micro controller core; and a real-time clock provider providing a real-time clock after resetting the micro controller core.

The meter may further include a program updating bus through which the program is transmitted, and the update controller may transmit the program of the storing unit to the program memory of the micro controller after stopping operations of the micro controller and the interface so as to update the program.

The interface may include a plurality of communication circuits, and after stopping operations of other communication circuits among the plurality of the communication circuits of the interface and an operation of the micro controller so as to update the program, the update controller transmits the program of the storing unit to the program memory of the micro controller through at least one of communication circuits in operation among the communication circuits of the interface.

The update controller may generate control signals and addresses of the storing unit and the program memory to thereby transmit the program through the program updating bus.

The storing unit may include: a storing memory storing the detection result under the control of the micro controller; and an updating memory storing the transmitted program under the control of the micro controller.

The micro controller may further include the interface.

The micro controller may have an update time which is within the predetermined period of the storing time.

The program may be firmware used for the operating of the micro controller.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

An exemplary embodiment of the present invention will now be described in detail with reference to the accompanying drawings. This invention may, however, be embodied in many different forms and should not be construed as being limited to the embodiment set forth herein. Rather, this embodiment is provided so that this disclosure will be thorough and complete, and will fully convey the scope of the invention to those skilled in the art.

Figure 1:
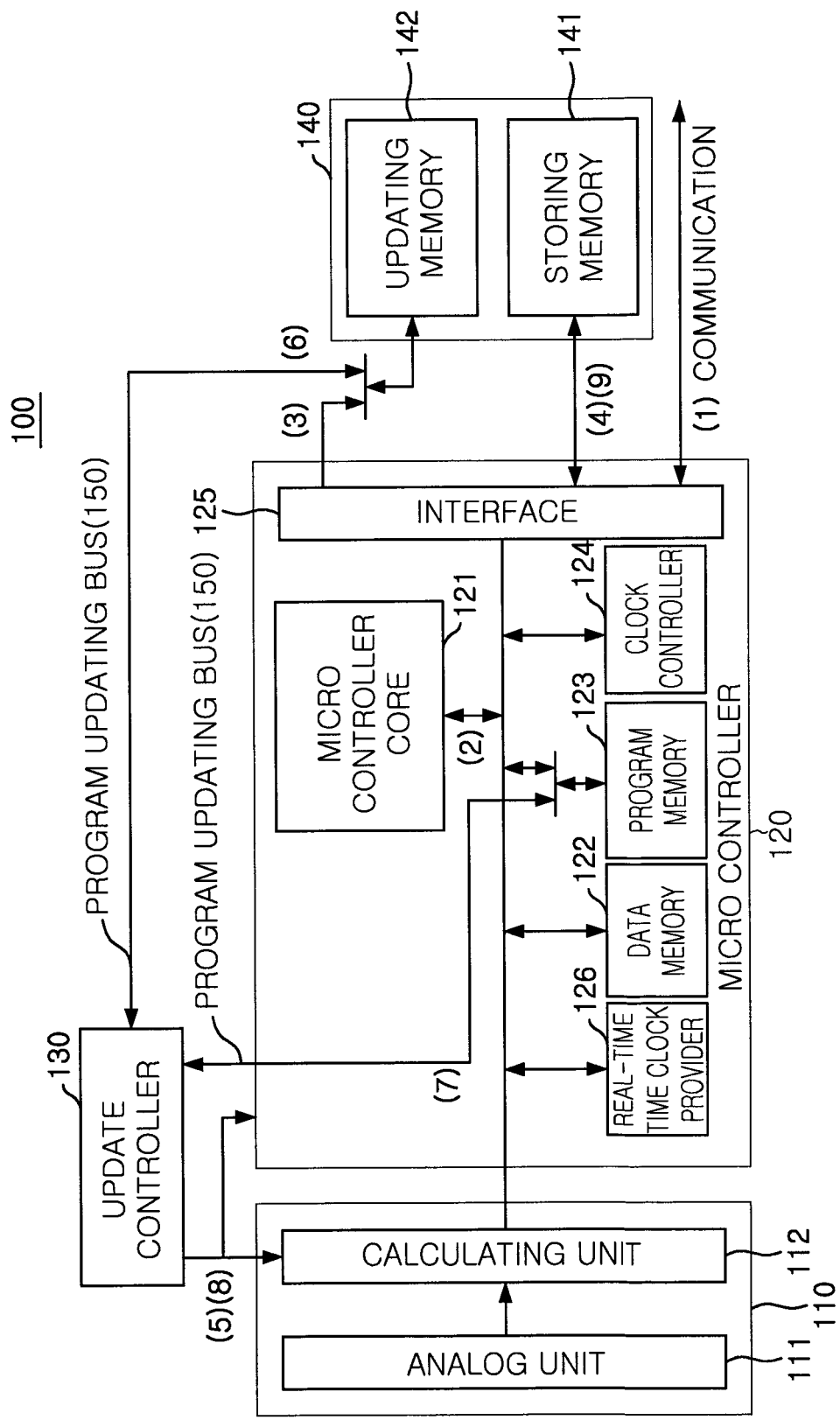
FIG. 1 is a block diagram schematically showing an electronic apparatus or a meter according to an exemplary embodiment of the present invention.

FIG. 1 is a block diagram schematically showing an electronic apparatus or a meter according to an exemplary embodiment of the present invention.

Referring to FIG. 1, the electronic apparatus according to the exemplary embodiment of the present invention may include an operation unit 110, a micro controller 120, an update controller 130, and a storing unit 140, and further include an interface 125.

The operation unit 110 may perform a preset operation, and the micro controller 120 may control the result of an operation of the operation unit 110 to be stored according to a predetermined period of storing time, and control a program transmitted from the outside to be stored for updating. The update controller 130 may control the stored program to be updated and uploaded to the micro controller 120 during the predetermined period of storing time. The storing unit 140 may store the operation result and the transmitted program under the control of the micro controller 120.

More particularly, the electronic apparatus according to the exemplary embodiment of the present invention may include a meter 100 which measures physical amounts for electricity, gas, water which are supplied to a user. Herein, although it has been illustrated in the embodiment of the present invention that the meter 100 can measure physical amounts of electricity, gas, water, and the like, and the present invention is not limited thereto.

The operation unit 110 of the meter 100 may detect physical amounts of electricity, gas, water which have been supplied to a user, to thereby accumulatively calculate the detected results. Thus, the operation unit 110 may include an analog unit 111, and a calculating unit 112.

The analog unit 111 may receive the physical amounts of the electricity, gas, and water, and the like, which have been supplied to a user, and may convert the received physical amounts into digital data.

The calculating unit 112 calculates the digital data received from the analog unit 111. At this time, the calculating unit 112 may calculate the amount of electricity, gas, and water which a user has used during a predetermined period of time.

The micro controller 120 may control the usage of the user, obtained by the calculation of the calculating unit 112, to be stored in the storing unit 140, and control the program, transmitted from the outside through the interface 125, to be stored in the storing unit 140. At this time, the interface 125 may be mounted on the outside of the micro controller 120, and may also be mounted within the micro controller 120. The interface 125 may be provided with a plurality of communication circuits, such as a Universal Asynchronous Receiver/Transmitter (UART), a Serial Peripheral Interface (SPI), an Inter-Integrated Circuit (I2C), RS-232/485, and an Infrared Data Association (IrDA).

The update controller 130 may allow the program stored in the storing unit 140 to be updated and uploaded to the micro controller 120 after resetting the micro controller 120. Herein, the program may include firmware or an operating program required for the operating of the micro controller 120.

The micro controller 120 may further include a micro controller core 121, a data memory 122, a program memory 123, a clock controller 124, and a real-time clock provider 126, and may further include the interface 125 as described above.

The real-time clock provider 126 may provide a real-time clock to the micro controller core 121. When an interrupt occurs at preset intervals of time during the real-time clock provided by the real-time clock provider 126, the micro controller core 121 may control the usage, obtained by accumulative-calculation of the calculating unit 112, to be stored according to a predetermined period of storing time. The micro controller core 121 may also perform various operations, such as usage billing, or statistics of usage amount, by using the accumulatively calculated usage. For example, the micro controller core 121 may control the accumulatively-calculated usage of the calculating unit 112 to be stored according to a predetermined period of storing time, such as 1 minute, 10 minutes, or 30 minutes.

The program memory 123 stores the program used for various operations and then provides a program desired by a user to the micro controller core 121, in response to the request of the micro controller core 121. The data memory 122 stores a desired program for a user to use, and provides data suitable for the desired program to the micro controller core 121 in response to the request of the micro controller core 121.

The clock controller 124 provides a clock signal necessary within the micro controller 120, and the real-time clock provider 126 provides a real-time clock.

The storing unit 140 may include a storing memory 141 and an updating memory 142.

The storing memory 141 may store the usage accumulatively-calculated by the calculating unit 112 under the control of the micro controller core 121. The updating memory 142 receives and stores the program transmitted from the outside, and transfers the program to the program memory 123 for updating the program, under the control of the micro controller 120.

Figure 2:
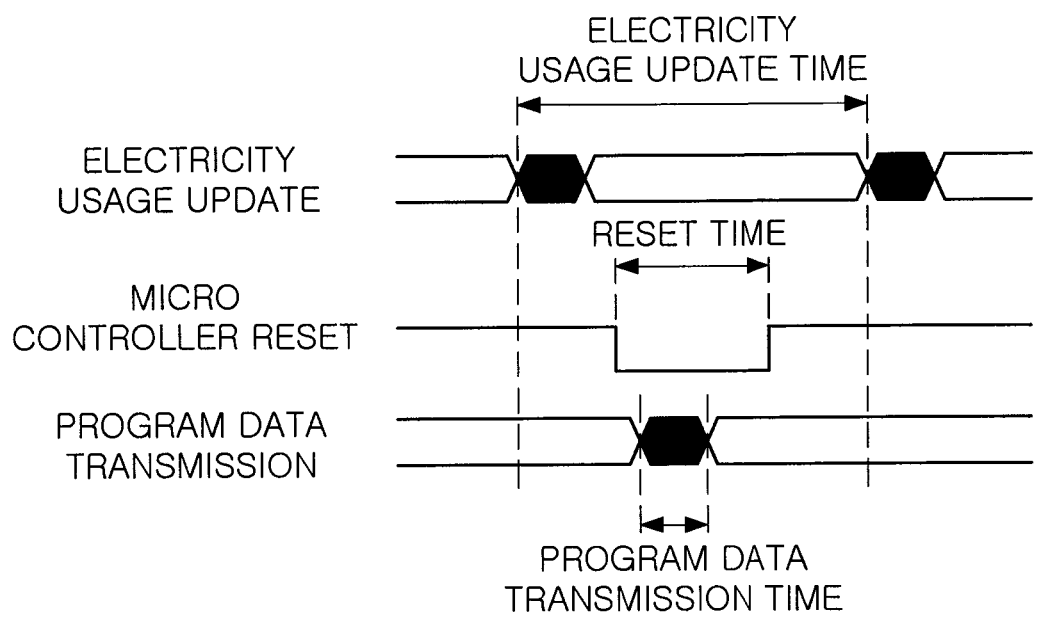
FIG. 2 is a timing chart showing how to update a program by the electronic apparatus or the meter according to the exemplary embodiment of the present invention.

FIG. 2 is a timing chart showing how a program is updated by the electronic apparatus or the meter according to the exemplary embodiment of the present invention.

Referring to FIG. 2, together with FIG. 1, for example, in a case where the meter 100 measures an amount of electricity supplied to a user, first, a program to be updated may be transmitted through the interface 125 from the outside, while the meter measures the amount of electricity (reference numeral (1)).

Thus, the micro controller core 121 recognizes that the data transmitted through the interface 125 is a program to be updated, and stores the transmitted program in the updating memory 142 of the storing unit 140 (reference numerals (2) and (3)).

The micro controller core 121 does not immediately update the program, and the micro controller core 121 stores a current time, as well as the amount of electricity having been used until the present time on the basis of the predetermined period of storing time, in the storing memory 141 of the storing unit 140 (reference numeral (4)).

The update controller 130 allows the accumulative-calculation operation of the calculating unit 112 to be continuously performed, and transfers a reset-signal, used for the stopping of operations, to the micro controller core 121, so as to update the program (reference numeral (5)). At this time, the calculating unit 112 continues to perform a calculation operation for the amount of electricity, without being reset.

Thereafter, the update controller 130 reads the program stored in the updating memory 142 of the storing unit 140 and then stores the read program in the program memory 123 (reference numerals (6) and (7)). At this time, after stopping the operations of the micro controller 120 and the interface 125 so as to update the program, the update controller 130 may transmit the program of the storing unit 140 to the program memory 123 through a program updating bus 150 which is constructed in a separate manner. To this end, the update controller 130 generates control signals for addresses, enabling, and writing/reading of the updating memory 142 and the program memory 123, and then transmits the control signals through the program updating bus 150, so as to read the data of the program memory 123 and the updating memory of the storing unit 140.

In contrast to this, the update controller 130 may stop the operations of a plurality of communication circuits of the interface 125 even without using a separate program updating bus 150, and transmit the program by allowing the operation of at least one of the communication circuits.

Next, the update controller 130 releases the stopping of operations of the micro controller core 121, so as to start the micro controller core 121 (reference numeral (8)).

Finally, as the program is restarted, the micro controller core 121 is booted up. The micro controller core 121 reads the time at which an amount of electricity has been finally stored in the storing memory 141 of the storing unit 140 (hereinafter, referred to as 'finally-stored time'), and compares the finally-stored time with current time from the real-time clock provider 126. As a result of the comparison result, it is determined whether the time taken to update the program is within the predetermined period of storing time (reference numeral (9)). When it is determined that the time taken to update the program is within the predetermined period of storing time, the micro controller core 121 stores an amount of electricity in the storing memory 141 according to the predetermined period of storing time on the basis of a clock provided in real time by the real-time clock provider 126. To this end, the real-time clock provider 126 provides a real-time clock. On the other hand, when it is determined that the time taken to update the program is not within the predetermined period of storing time, the operation defined by the program is performed. Herein, the operation defined by the program may include the following operations. The storing frequency and time period for unmeasured electricity during the resetting of the micro controller core 121 are controlled to be stored in the storing memory 141, thereby notifying the number of times and the time to a user, wherein the storing frequency represents how often the predetermined storing period occurs. In addition, an interpolation value of the amount of electricity having finally been stored in the storing memory 141 and an amount of electricity, stored after updating the program, is stored instead of the amount of unmeasured electricity.

However, the time taken to update most programs is within the predetermined period of the storing time.

As shown in FIG. 2, when it is assumed that the time taken to store an amount of electricity is about 1 minute, the micro controller core 121 is reset for updating the program within the updating of the program. At this time, the reset time may include time taken to transmit the program stored in the updating memory 142 to the program memory 123.

For example, in consideration of the fact that it takes 200 ns to 250 ns to read or write one address from an EEPROM and a program of the watt-hour meter has a size of 256 Kbyte, it takes 6.4 ms, obtained by multiplying 250 ns with 256K. Further, in consideration of a case in which the interface is a serial interface, the program may be transferable within several seconds (sec). Thus, while the program of the micro controller core is updated, there is no problem in that the amount of supplied electricity is stored. Therefore, the continuous measurement for the amount of supplied electricity may be implemented, which results in the accurate operations in outputting statistics and calculating a charge for the amount of used electricity.

The electronic apparatus and meter in the exemplary embodiment of the present invention can calculate physical amounts of supplied electricity, gas, and the like, and perform a continuous operation while updating an operating program and firmware, thereby realizing effective and accurate charging according to the amount of supplied electricity.

While the present invention has been shown and described in connection with the exemplary embodiment, it will be apparent to those skilled in the art that modifications and variations can be made without departing from the spirit and scope of the invention as defined by the appended claims.

What is claimed is:

1. An electronic apparatus operable during program updating, the electronic apparatus comprising:
   an operation unit configured to perform a preset operation;
   a micro controller configured to
      control a result of the operation of the operation unit to be stored according to a predetermined period of storing time, and
      control a program received from outside to be stored;
   an update controller configured to reset the micro controller for a predetermined time to allow the program stored during the predetermined period of storing time to be updated in the micro controller; and
   a storing unit configured to store the program and the result of the operation of the operation unit under control of the micro controller, wherein
   the micro controller is configured to calculate the result of the operation of the operation unit for a reset time when the reset time is longer than the predetermined period of storing time.

2. The electronic apparatus of claim 1, wherein the operation unit is configured to detect physical amounts and accumulatively calculate the detected physical amounts.

3. The electronic apparatus of claim 2, further comprising an interface through which the program is to be received from the outside.

4. The electronic apparatus of claim 3, wherein the update controller is configured to
   allow the program stored in the storing unit during the predetermined period of the storing time to be updated in the micro controller, and
   reset the micro controller.

5. The electronic apparatus of claim 4, wherein the micro controller comprises:
   a micro controller core configured to control the result of the operation of the operation unit to be stored;
   a data memory configured to store data required for the micro controller core;
   a program memory configured to store the program by the update controller;
   a clock controller configured to provide a clock required for the micro controller core; and
   a real-time clock provider configured to provide a real-time clock after resetting the micro controller core.

6. The electronic apparatus of claim 5, further comprising a program updating bus through which the program is to be transmitted, wherein
   the update controller is configured to transmit the program stored in the storing unit to the program memory of the micro controller through the program updating bus, after stopping operations of the interface and the micro controller so as to update the program.

7. The electronic apparatus of claim 5, wherein
   the interface includes a plurality of communication circuits, and
   after stopping operations of other communication circuits among the plurality of the communication circuits of the interface and an operation of the micro controller so as to update the program, the update controller is configured to transmit the program stored in the storing unit to the program memory of the micro controller through at least one communication circuit remaining in operation among the communication circuits of the interface.

8. The electronic apparatus of claim 6, wherein the update controller is configured to generate control signals and addresses of the program memory and the storing unit to thereby transmit the program through the program updating bus.

9. The electronic apparatus of claim 5, wherein the micro controller further comprises the interface.

10. The electronic apparatus of claim 1, wherein the micro controller has an update time which is within the predetermined period of the storing time.

11. The electronic apparatus of claim 1, wherein the program includes firmware for operating the micro controller.

12. A meter operable during program updating, the meter comprising:
   an operation unit configured to perform a preset detection operation;
   a micro controller configured to
      control a result of the detection of the operation unit to be stored according to a predetermined period of storing time, and
      control a program received from outside to be stored;
   an update controller configured to reset the micro controller for a predetermined time to allow the program stored during the predetermined period of storing time to be updated in the micro controller; and
   a storing unit configured to store the program and the result of the detection of the operation unit under control of the micro controller, wherein
   the micro controller is configured to calculate the result of the detection of the operation unit for a reset time when the reset time is longer than the predetermined period of storing time.

13. The meter of claim 12, wherein the operation unit is configured to
   detect a physical amount of at least one of electricity, gas, and water supplied to a user,
   accumulatively calculate the detected physical amount, and
   store the calculated amount according to the predetermined period of the storing time.

14. The meter of claim 12, wherein the operation unit comprises:
   an analog unit configured to convert detected analog data into digital data; and
   a calculating unit configured to accumulatively calculate the digital data from the analog unit under the control of the micro controller.

15. The meter of claim 12, further comprising an interface through which the program is to be received from the outside.

16. The meter of claim 15, wherein the update controller is configured to
   allow the program stored in the storing unit during the predetermined period of the storing time to be updated in the micro controller, and
   reset the micro controller.

17. The meter of claim 16, wherein the micro controller comprises:
   a micro controller core configured to control the result of the detection of the operation unit to be stored;
   a data memory configured to store data required for the micro controller core;
   a program memory configured to store the program by the update controller;

a clock controller configured to provide a clock required for the micro controller core; and a real-time clock provider configured to provide a real-time clock after resetting the micro controller core.

18. The meter of claim 17, further comprising a program updating bus through which the program is to be transmitted, wherein the update controller is configured to transmit the program stored in the storing unit to the program memory of the micro controller after stopping operations of the micro controller and the interface so as to update the program.

19. The meter of claim 17, wherein the interface includes a plurality of communication circuits, and after stopping operations of other communication circuits among the plurality of the communication circuits of the interface and an operation of the micro controller so as to update the program, the update controller is configured to transmit the program stored in the storing unit to the program memory of the micro controller through at least one communication circuit remaining in operation among the communication circuits of the interface.

20. The meter of claim 18, wherein the update controller is configured to generate control signals and addresses of the storing unit and the program memory to thereby transmit the program through the program updating bus.

21. The meter of claim 14, wherein the storing unit comprises:

a storing memory configured to store the result of the detection of the operation unit under the control of the micro controller; and an updating memory configured to store the transmitted program under the control of the micro controller.

22. The meter of claim 17, wherein the micro controller further comprises the interface.

23. The meter of claim 12, wherein the micro controller has an update time which is within the predetermined period of the storing time.

24. The meter of claim 12, wherein the program includes firmware for operating the micro controller.

* * * * *